United States Patent
Kobayashi et al.

(10) Patent No.: US 11,434,798 B2
(45) Date of Patent: Sep. 6, 2022

(54) CATALYST WARM-UP CONTROL METHOD FOR HYBRID VEHICLE AND CATALYST WARM-UP CONTROL DEVICE FOR HYBRID VEHICLE

(71) Applicant: Nissan Motor Co., Ltd., Yokohama (JP)

(72) Inventors: Azusa Kobayashi, Kanagawa (JP); Tsuyoshi Ishikawa, Kanagawa (JP); Hidekatsu Akiyama, Kanagawa (JP); Shinsuke Higuchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 206 days.

(21) Appl. No.: 16/772,592

(22) PCT Filed: Dec. 15, 2017

(86) PCT No.: PCT/JP2017/045221
§ 371 (c)(1),
(2) Date: Jun. 12, 2020

(87) PCT Pub. No.: WO2019/116587
PCT Pub. Date: Jun. 20, 2019

(65) Prior Publication Data
US 2020/0386135 A1 Dec. 10, 2020

(51) Int. Cl.
*F01N 3/20* (2006.01)
*B60W 20/16* (2016.01)
(Continued)

(52) U.S. Cl.
CPC .............. *F01N 3/2006* (2013.01); *B60K 6/46* (2013.01); *B60W 20/16* (2016.01); *B60W 20/17* (2016.01);
(Continued)

(58) Field of Classification Search
CPC ............ F01N 3/2006; F01N 2900/104; F01N 2900/1626; B60K 6/46; B60W 20/16;
(Continued)

(56) References Cited

U.S. PATENT DOCUMENTS 6,470,985 B1 * 10/2002 Inada .................... B60W 10/08
903/917
8,838,316 B2 * 9/2014 Whitney ............... B60W 20/16
180/65.265
(Continued)

FOREIGN PATENT DOCUMENTS

JP H11-082093 A 3/1999
JP 2002-070542 A 3/2002
(Continued)

*Primary Examiner* — Brandon D Lee
(74) *Attorney, Agent, or Firm* — Young Basile Hanlon & MacFarlane, P.C.

(57) ABSTRACT

A catalyst warm-up control method for a hybrid vehicle includes a battery supplying electric power to an electric motor, the battery is charged by an engine for electric power generation, and exhaust gas discharged from the engine 1 is treated by a catalyst. By the catalyst warm-up control method, when temperature of the catalyst is lower than required warm-up temperature for activating the catalyst, target revolution speed and target torque of the engine are controlled based on a state of charge of the battery, and, when target revolution speed is lower than lower-limit revolution speed at which the catalyst can be heated to the required warm-up temperature, the target revolution speed is controlled so as to be required warm-up revolution speed that is equal to or higher than the lower-limit revolution speed.

10 Claims, 6 Drawing Sheets

(51) Int. Cl.
  *B60W 20/17*   (2016.01)
  *B60K 6/46*    (2007.10)
  *F02D 29/06*   (2006.01)
  *F02D 43/00*   (2006.01)
  *B60W 20/13*   (2016.01)
  *B60W 10/06*   (2006.01)
  *B60W 10/26*   (2006.01)

(52) U.S. Cl.
  CPC ............ *F02D 29/06* (2013.01); *F02D 43/00* (2013.01); *B60W 10/06* (2013.01); *B60W 10/26* (2013.01); *B60W 20/13* (2016.01); *F01N 2900/104* (2013.01); *F01N 2900/1626* (2013.01)

(58) Field of Classification Search
  CPC ...... B60W 20/17; B60W 10/06; B60W 10/26; B60W 20/13; B60W 2510/244; B60W 2710/0644; B60W 2710/0666; B60W 10/08; B60W 2530/12; B60W 2530/13; B60W 2720/10; F02D 29/06; F02D 43/00; F02D 45/00; Y02T 10/40; Y02T 10/62; B60Y 2200/92
  See application file for complete search history.

(56) References Cited

U.S. PATENT DOCUMENTS

| | | | |
|---|---|---|---|
| 2010/0000501 A1 | 1/2010 | Douzono et al. | |
| 2012/0173062 A1 | 7/2012 | Madurai et al. | |
| 2015/0134160 A1* | 5/2015 | Liang | B60W 30/18054 180/65.265 |
| 2018/0244266 A1* | 8/2018 | Habu | B60K 6/445 |

FOREIGN PATENT DOCUMENTS

| | | |
|---|---|---|
| JP | 2010-013977 A | 1/2010 |
| JP | 2014-065453 A | 4/2014 |
| JP | 2015-137619 A | 7/2015 |
| JP | 2017-128212 A | 7/2017 |

* cited by examiner

CATALYST WARM-UP CONTROL METHOD FOR HYBRID VEHICLE AND CATALYST WARM-UP CONTROL DEVICE FOR HYBRID VEHICLE

TECHNICAL FIELD

The present invention relates to a catalyst warm-up control method for a hybrid vehicle and a catalyst warm-up control device for a hybrid vehicle.

BACKGROUND ART

In a hybrid vehicle, when exhaust gas purifying performance is deteriorated as temperature of a catalyst attached to an exhaust system of an engine falls due to continuation of engine stoppage, continuation of engine motoring, or the like, the engine is operated and combusted so as to generate electric power for catalyst warm-up (see Japanese Unexamined Patent Application Publication No. 2017-128212).

Here, when electric power is generated by using the engine, the engine is set to optimization revolution speed and optimization torque at which fuel consumption efficiency of the engine gets the highest. As a result, a battery is charged by optimization generated electric power that is generated based on the optimization revolution speed and the optimization torque, and exhaust gas discharged in accordance with the optimization revolution speed warms up the catalyst.

SUMMARY OF INVENTION

In the hybrid vehicle, upper-limit generated electric power of the engine is limited based on an SOC (a state of charge) of the battery, and, when the optimization generated electric power exceeds the upper-limit generated electric power, target revolution speed and target torque of the engine are limited, and the generated electric power is reduced to the upper-limit generated electric power. However, even when the catalyst is warmed up by the engine of which the target revolution speed is limited as described above, it may take time until temperature for activating the catalyst is reached.

Therefore, an object of the invention is to reliably warm up a catalyst regardless of an SOC of a battery in a hybrid vehicle.

A catalyst warm-up control method for a hybrid vehicle according to one embodiment of the present invention is a catalyst warm-up control method for a hybrid vehicle in which a battery supplies electric power to an electric motor, the battery is charged by an engine for electric power generation, and exhaust gas discharged from the engine is treated by a catalyst, wherein when temperature of the catalyst is lower than required warm-up temperature for activating the catalyst, target revolution speed and target torque of the engine are controlled based on a state of charge of the battery, and, when the target revolution speed is lower than lower-limit revolution speed at which the catalyst can be heated to the required warm-up temperature, the target revolution speed is controlled so as to be required warm-up revolution speed that is equal to or higher than the lower-limit revolution speed.

DESCRIPTION OF EMBODIMENTS

Hereinafter, an embodiment of the invention is described with reference to the drawings.

[Configuration of Hybrid Vehicle]

Figure 1:
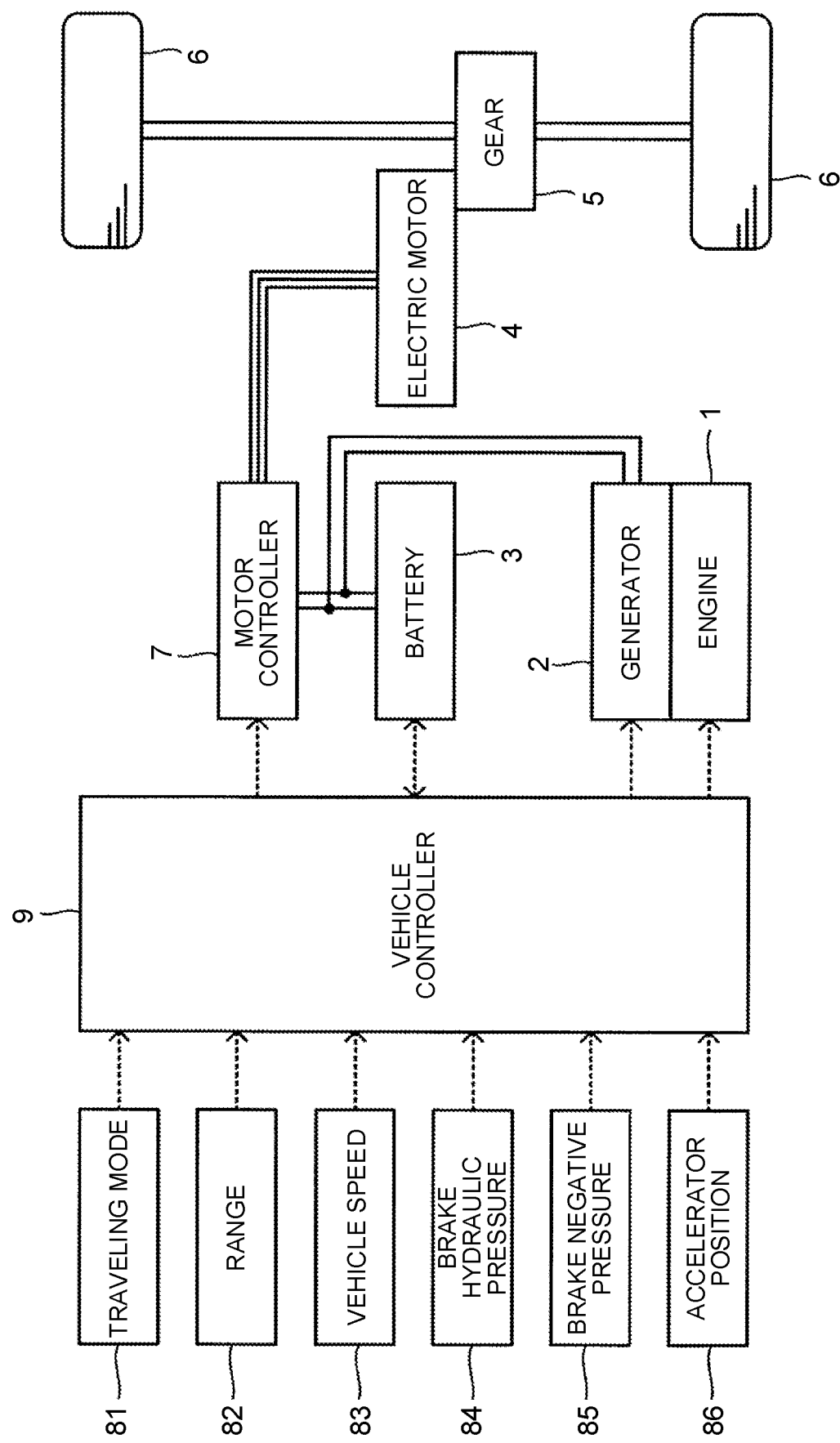
FIG. 1 is a block diagram of a configuration of a hybrid vehicle to which an embodiment is applied.

FIG. 1 is a block diagram showing a configuration of a hybrid vehicle to which the embodiment is applied. The hybrid vehicle to which the embodiment is applied includes an engine 1, a generator 2, a battery 3, an electric motor 4, wheels 6 (driving wheels), and a motor controller 7 that controls the electric motor 4.

In the hybrid vehicle, the wheels 6 are not driven by the engine 1 but by electric power supplied from the battery 3. Since the engine 1, the battery 3, and the wheels 6 are connected in series (series connection), the hybrid vehicle is referred to as a series hybrid car.

The engine 1 is mechanically connected to the generator 2 through a speed reducer (not shown). The generator 2 is connected to the battery 3 so that electric power transmission and reception are enabled. It is possible to transmit and receive electric power between the battery 3 and the motor controller 7, and between the motor controller 7 and the electric motor 4.

Driving force of the engine 1 is transmitted to the generator 2, and the generator 2 generates electric power with use of driving force of the engine 1. The battery 3 is charged with electric power generated in the generator 2. The electric power charged in the battery 3 is transmitted to the electric motor 4 through the motor controller 7, and the electric motor 4 is driven by electric power supplied from the battery 3. The wheels 6 rotate due to the driving force of the electric motor 4 through a gear 5, thereby making the hybrid vehicle travel. At the time of deceleration, the electric motor 4 applies regenerative braking force to the wheels 6, thereby generating regenerative electric power, and the regenerative electric power is charged in the battery 3 through the motor controller 7. When an SOC (a state of charge) of the battery 3 is at a value equal to or higher than a given value, and the upper-limit charging electric power is lower than the regenerative electric power, then excessive regenerative electric power is not charged in the battery 3 and supplied to the generator 2. Then, as the generator 2 is driven and causes the engine 1 to revolve, the excessive regenerative electric power is consumed.

The hybrid vehicle includes a mode switch 81 that alternatively selects a traveling mode from a plurality of traveling modes, a select lever 82 operated by a driver when selecting a range of an automatic transmission, a vehicle speed sensor 83 that detects vehicle speed, a brake hydraulic pressure sensor 84 that detects braking force, a brake negative pressure sensor 85 that detects brake negative pressure used for assisting a brake pedal depressing operation, an accelerator position sensor 86 that detects an accelerator position (accelerator opening degree), and a vehicle controller 9 (a catalyst warm-up control device) that controls the entire hybrid vehicle.

The vehicle controller 9 is electrically connected to the mode switch 81, the select lever 82, the vehicle speed sensor 83, the brake hydraulic pressure sensor 84, the brake negative pressure sensor 85, and the accelerator position sensor 86. The vehicle controller 9 receives a signal indicating the selected traveling mode from the mode switch 81, receives a signal indicating the selected range from the select lever 82, receives a signal indicating speed of the hybrid vehicle from the vehicle speed sensor 83, receives a signal indicating the brake hydraulic pressure from the brake hydraulic pressure sensor 84, receives a signal indicating the brake negative pressure from the brake negative pressure sensor 85, and receives a signal indicating the accelerator position from the accelerator position sensor 86.

The traveling modes that can be selected by the mode switch 81 include a normal mode in which the regenerative braking force by the electric motor 4 is relatively small, an eco-mode in which the regenerative braking force is larger than that in the normal mode, a silent mode in which electric power generation by the engine 1 is stopped by an operation of the mode switch 81, a charge mode in which electric power is generated with use of the engine 1 in accordance with an operation of the mode switch 81, and so on.

The ranges that can be selected by the select lever 82 include a drive range, a reverse range, a neutral range, a parking range, and so on.

The vehicle controller 9 is connected to the engine 1, the generator 2, the battery 3, and the motor controller 7. The vehicle controller 9 transmits an engine torque command value (hereinafter, referred to as a torque command value) to the engine 1, transmits a revolution speed command value to the generator 2, and transmits a motor torque command value to the motor controller 7.

The vehicle controller 9 is realized by, for example, a general-purpose microcomputer that includes a CPU (a central processing unit), a memory, and an input-output part. A computer program that allows the microcomputer to function as the vehicle controller 9 is installed in the microcomputer and executed. The vehicle controller 9 may be realized by software as described above. However, individual hardware may be configured for each unit that also performs information processing in the vehicle controller 9. Also, the motor controller 7 may be configured as software or hardware.

When the SOC of the battery 3 is smaller than a given lower-limit value, the vehicle controller 9 (an ECU 91 described later) causes the engine 1 and the generator 2 to generate electric power and charges the battery 3. When the SOC reaches a given upper-limit value, the vehicle controller 9 limits or stops electric power generation. Further, when the regenerative electric power exceeding the upper-limit charging electric power of the battery 3 is generated, the vehicle controller 9 supplies the excessive regenerative electric power to the generator 2, and the generator 2 causes the engine 1 to revolve. Thus, the excessive regenerative electric power is consumed. Furthermore, when the brake negative pressure is smaller than a given value, the vehicle controller 9 supplies electric power to the generator 2 so as to revolve the engine 1, thereby restoring the brake negative pressure.

Figure 2:
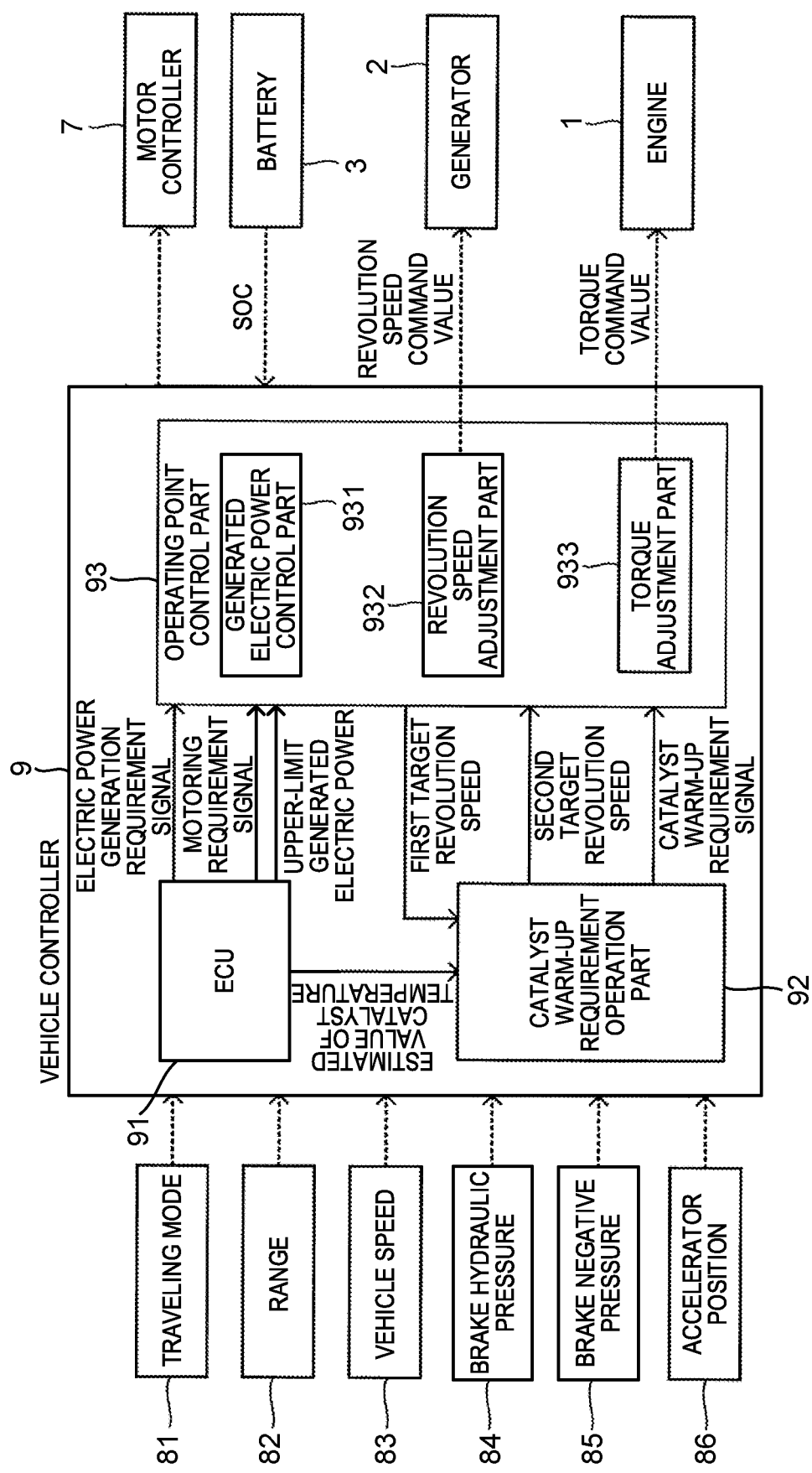
FIG. 2 is a control block diagram of a catalyst warm-up control device for the hybrid vehicle according to the embodiment.

FIG. 2 is a control block diagram of the catalyst warm-up control device for the hybrid vehicle according to this embodiment. As shown in FIG. 2, the vehicle controller 9 includes the ECU 91 (the engine control unit) (may be a separate configuration from the vehicle controller 9), a catalyst warm-up requirement operation part 92 (a catalyst warm-up control device), and an operating point control part 93 (the catalyst warm-up control device).

The ECU 91 controls the entire hybrid vehicle based on the traveling mode, the range, the signals input from the various sensors, and the computer program. The ECU 91 transmits a command signal (an electric power generation requirement signal, or a motoring requirement signal) to the operating point control part 93 based on a traveling state of the hybrid vehicle (including a situation of the SOC), and is also able to stop transmission of the command signal.

The electric power generation requirement signal is a signal requiring electric power generation with use of the engine 1 and the generator 2. When sending the electric power generation requirement signal, the ECU 91 calculates the upper-limit generated electric power that can be generated by the engine 1 and the generator 2 based on the size of the SOC input from the battery 3, and transmits the upper-limit generated electric power to the operating point control part 93. As described above, the motoring requirement signal is transmitted when excessive regenerative electric power is consumed, or when the brake negative pressure is restored.

The ECU 91 also estimates temperature of a catalyst attached to an exhaust system of the engine 1 based on the traveling state of the hybrid vehicle, and transmits information of an estimated value of the catalyst temperature to the catalyst warm-up requirement operation part 92. The temperature of the catalyst may be actually measured by a temperature sensor or the like, instead of being estimated.

The catalyst warm-up requirement operation part 92 determines whether or not warm-up control for the catalyst is performed based on the estimated value of the catalyst temperature (or the measured value by the temperature sensor) input by the ECU 91. When the estimated value of the catalyst temperature is lower than required warm-up temperature, the catalyst warm-up requirement operation part 92 transmits a catalyst warm-up requirement signal (a catalyst warm-up requirement flag), and then, when the estimated value of the catalyst temperature reaches the required warm-up temperature or set temperature that is higher than the required warm-up temperature by given temperature (for example, 30 degrees), the catalyst warm-up requirement operation part 92 stops transmitting the catalyst warm-up requirement signal. Alternatively, when a given period of time (for example, 15 seconds) elapses after transmission of the catalyst warm-up requirement signal, the catalyst warm-up requirement operation part 92 stops transmitting the catalyst warm-up requirement signal.

Further, when the catalyst warm-up requirement operation part 92 transmits the catalyst warm-up requirement signal to the operating point control part 93, information regarding first target revolution speed described later is input to the catalyst warm-up requirement operation part 92 by the operating point control part 93, and the catalyst warm-up requirement operation part 92 replies information regarding second target revolution speed to the operating point control part 93.

When the first target revolution speed is lower than lower-limit revolution speed at which the catalyst can be heated to required warm-up temperature that is required in order to activate the catalyst, the second target revolution speed is set to required warm-up revolution speed that is equal to or higher than the lower-limit revolution speed. Further, when the first target revolution speed is the lower-limit revolution speed or higher, the second target revolution speed is set to the same value as the first target revolution speed.

Figure 3:
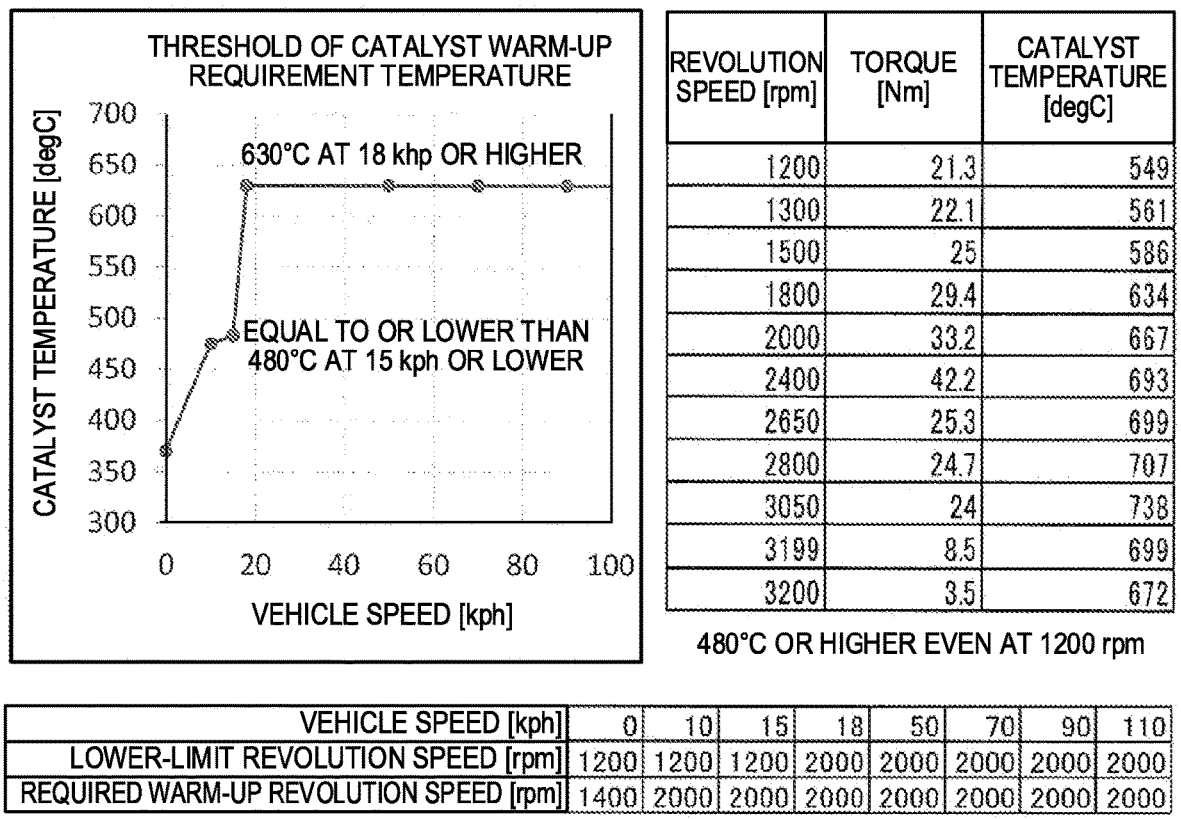
FIG. 3 is a view showing relations between vehicle speed and lower-limit revolution speed for warm-up requirement for a catalyst, and between required warm-up revolution speed and the vehicle speed, respectively.

Further, information regarding the vehicle speed is input to the catalyst warm-up requirement operation part 92, which then sets the required warm-up temperature and the required warm-up revolution speed based on the information regarding the vehicle speed. The details thereof are given later (FIG. 3).

The operating point control part 93 includes a generated electric power control part 931, a revolution speed adjustment part 932, and a torque adjustment part 933. The generated electric power control part 931 calculates (controls) target revolution speed and target torque based on the SOC of the battery 3. The revolution speed adjustment part 932 transmits a revolution command value based on the target revolution speed. The torque adjustment part 933 transmits a torque command value based on the target torque. Upon receipt of the information regarding the required warm-up revolution speed, the generated electric power control part 931 controls the target revolution speed (the first target revolution speed) to revolution speed (the second target revolution speed) pertaining to the required warm-up revolution speed.

Once the generated electric power control part 931 receives the electric power generation requirement signal or the catalyst warm-up requirement signal, the generated electric power control part 931 causes the engine 1 and the generator 2 to operate, and once the generated electric power control part 931 ends receiving the electric power generation requirement signal or the catalyst warm-up requirement signal, the generated electric power control part 931 stops the engine 1 and the generator 2. Further, once the generated electric power control part 931 receives the motoring requirement signal, the generated electric power control part 931 causes the generator 2 to operate without causing the engine 1 to operate. Once the generated electric power control part 931 ends receiving the motoring requirement signal, the generated electric power control part 931 stops the generator 2.

When the generated electric power control part 931 receives the electric power generation requirement signal, the generated electric power control part 931 generates the revolution speed command value through the revolution speed adjustment part 932 and transmits the revolution speed command value to the generator 2. Also, the generated electric power control part 931 generates the torque command value through the torque adjustment part 933 and transmits the torque command value to the engine 1. The revolution speed command value and the torque command value are generated based on the upper-limit generated electric power that is determined based on the SOC of the battery 3.

It is preferred that the engine 1 and the generator 2 generate electric power with optimization revolution speed and optimization torque with which fuel consumption efficiency of the engine 1 is maximized. Therefore, the generated electric power control part 931 compares optimization generated electric power to the upper-limit generated electric power transmitted from the ECU 91. The optimization generated electric power is obtained from the product of the optimization revolution speed and the optimization torque. When the optimization generated electric power is lower than the upper-limit generated electric power, the target revolution speed is controlled so as to be the optimization revolution speed, and also, the target torque is controlled so as to be the optimization torque for electric power generation with use of the engine 1 and the generator 2.

Meanwhile, the upper-limit generated electric power is reduced as the SOC increases. Therefore, when the upper-limit generated electric power is smaller than the optimization generated electric power, the generated electric power control part 931 calculates the target revolution speed and the target torque so that the target revolution speed and the target torque are equal to the upper-limit generated electric power. At that time, the target revolution speed and the target torque are calculated so that abnormal noise such as rattle noise in the engine 1 (and abnormal noise generated from the generator 2) is not generated as described later.

Figure 4:
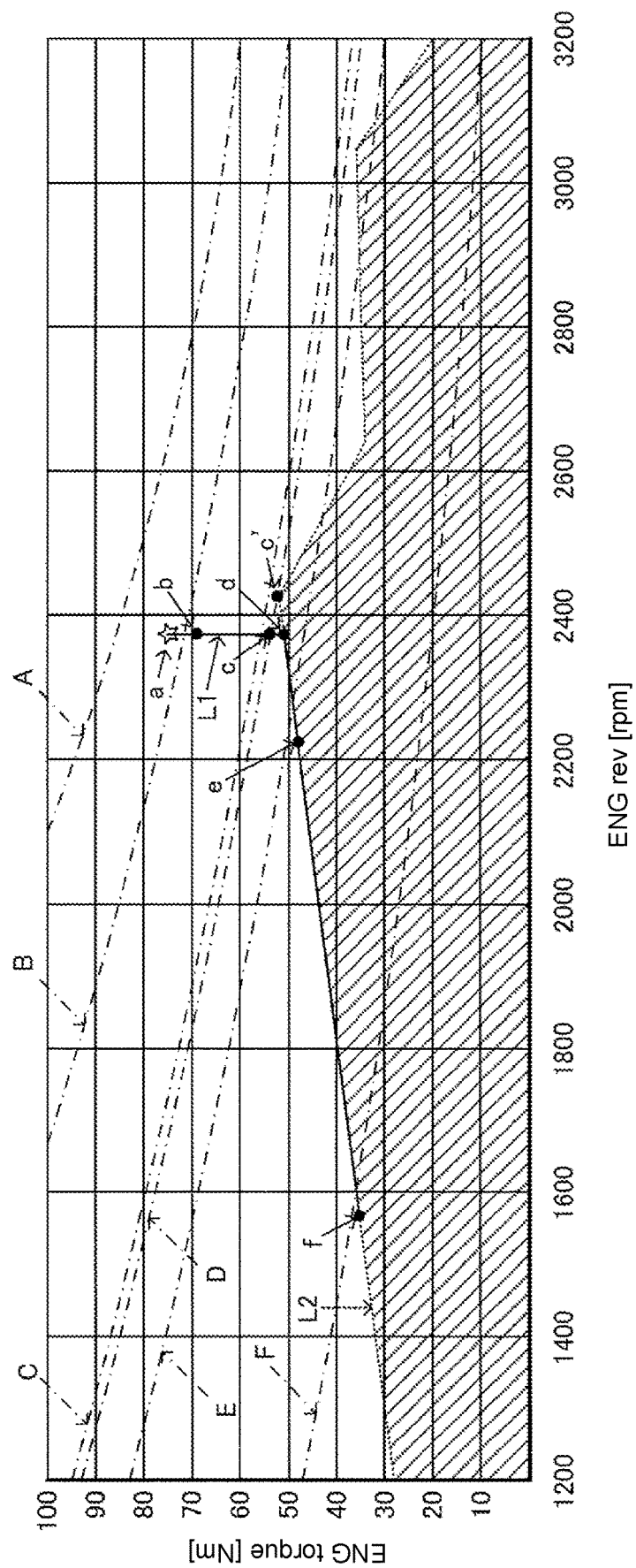
FIG. 4 is a view showing a relation between an operating point pertaining to target revolution speed and target torque of an engine in the hybrid vehicle, and upper-limit generated electric power determined by an SOC.
Figure 5:
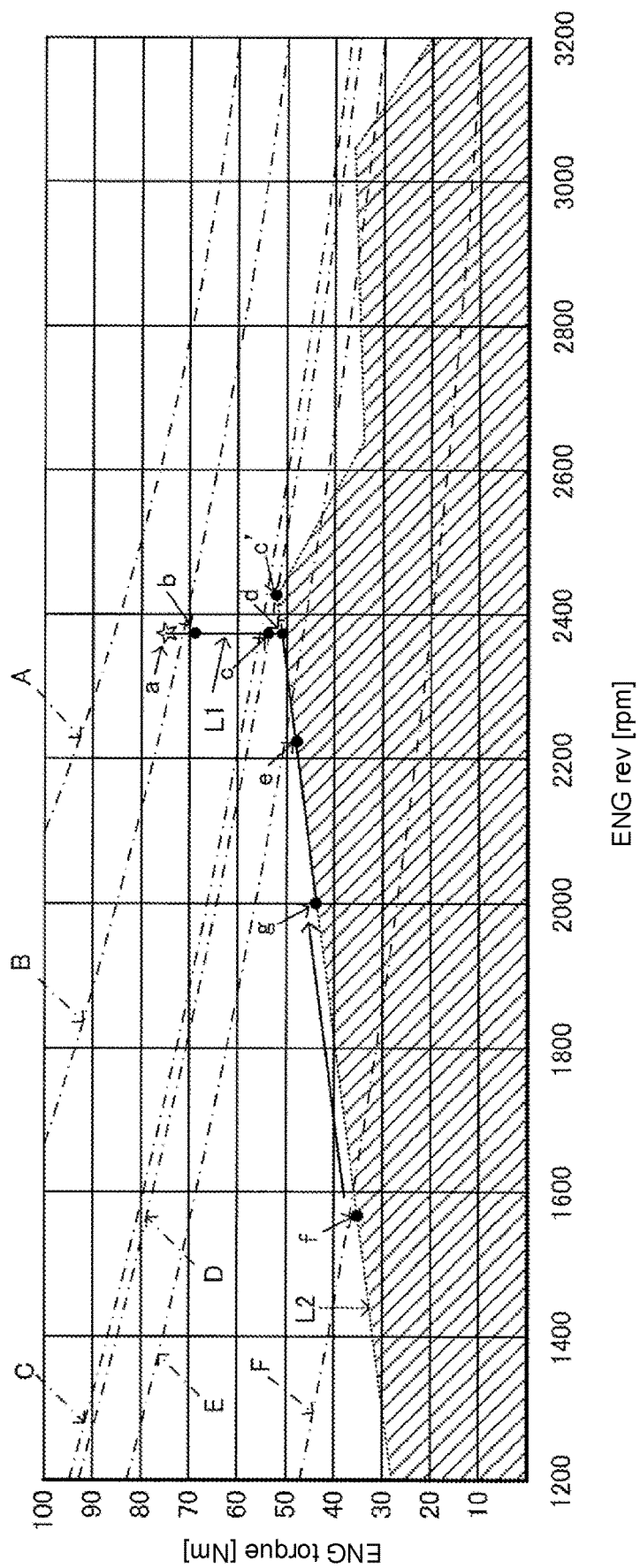
FIG. 5 is a view showing a relation between an operating point and upper-limit generated electric power determined by the SOC, the operating point pertaining to target revolution speed and target torque of the engine of the hybrid vehicle when warm-up control is performed.

Once the generated electric power control part 931 receives information regarding the required warm-up revolution speed from the catalyst warm-up requirement operation part 92, the generated electric power control part 931 calculates the target revolution speed and the target torque as described above, and also outputs information regarding the target revolution speed (the first target revolution speed) to the catalyst warm-up requirement operation part 92. Then, based on the second target revolution speed replied by the catalyst warm-up requirement operation part 92, the generated electric power control part 931 generates and transmits the revolution speed command value through the revolution speed adjustment part 932. At that time, the target torque is adjusted so that abnormal noise is not generated in the engine 1 as described above, and the torque command value is generated based on the adjusted target torque. Details regarding calculation of the target revolution speed and the target torque are described later (FIG. 4, FIG. 5).

[Relation Between Required Warm-Up Temperature for Catalyst and Vehicle Speed]

FIG. 3 is a view showing relations between the vehicle speed and the lower-limit revolution speed for warm-up requirement for the catalyst, and between the required warm-up revolution speed and the vehicle speed. The catalyst (for example, a three-way catalyst) performs purification treatment for exhaust gas discharged while the engine 1 is operating. Although the catalyst shows its purifying performance when it is warmed up, the catalyst is able to purify exhaust gas highly efficiently especially at temperature equal to or higher than given activation temperature. Meanwhile, when the vehicle speed is low, the target revolution speed of the engine 1 is generally set to low speed, and an amount of exhaust gas is small. Therefore, the temperature of the catalyst is allowed to be lower than the activation temperature to a certain extent. Therefore, in this embodiment, required warm-up temperature at which the catalyst is activated is determined based on the vehicle speed.

As shown in the upper-left graph in FIG. 3, temperature required to activate the catalyst is equal to or lower than 480° C. when the vehicle speed is equal to or lower than 15 kph, and is about 630° C. when the vehicle speed is equal to or higher than 18 kph. Further, the inventors of the present application have obtained knowledge that, as shown in the upper-right table in FIG. 3, in a range of actual revolution speed of the engine 1 (a supply amount of exhaust gas) from 1200 rpm to 3050 rpm, temperature of the catalyst increases monotonously as the actual revolution speed increases, and the catalyst is heated until temperature of the catalyst reaches as high as 549° C. that exceeds 480° C. when the actual revolution speed is 1200 rpm. Further, the inventors of the present application have obtained knowledge that, when the actual revolution speed is 2000 rpm, the catalyst is heated up to temperature equal to or higher than 660° C., that exceeds the activation temperature of 630° C.

Therefore, the catalyst warm-up requirement operation part 92 according to this embodiment sets the lower-limit revolution speed to 2000 rpm when the vehicle speed is equal to or higher than 18 kph, and also sets the lower-limit revolution speed to 1200 rpm when the vehicle speed is equal to or lower than 15 kph. Thus, the required warm-up revolution speed is set to 2000 rpm when the vehicle speed is equal to or higher than 18 kph. Meanwhile, the required warm-up revolution speed is set to 1400 rpm when the vehicle speed is equal to or lower than 15 kph. This is based on consideration of instability of purifying performance in a low temperature region of the catalyst (a low speed region of the vehicle speed).

[Relation Between Operating Point of Engine and SOC]

FIG. 4 is a view showing a relation between an operating point and the upper-limit generated electric power determined based on the SOC, the operating point pertaining to the target revolution speed and the target torque of the engine 1 in the hybrid vehicle. FIG. 5 is a view showing a relation between an operating point and the upper-limit generated electric power determined based on the SOC, the operating point pertaining to the target revolution speed and the target torque of the engine 1 when the warm-up control is performed in the hybrid vehicle. FIG. 4 and FIG. 5 show characteristic coordinates in which the horizontal axes represent the target revolution speed, and the vertical axes represent the target torque.

As described above, it is possible to obtain the target generated electric power that is output from the engine 1 and the generator 2 based on the product of the target revolution speed and the target torque. Therefore, the upper-limit generated electric power can be represented by curved lines A to F (hyperbolas) shown by chain lines in FIG. 4 and FIG. 5. Here, A to F are determined based on the SOC of the battery 3. When the upper-limit generated electric power is A, the SOC of the battery 3 is the lowest and the upper-limit generated electric power is the highest, and, as the upper-limit generated electric power changes from B, C, through D, the SOC increases and, at the same time, the upper-limit generated electric power is lowered accordingly. When the upper-limit generated electric power is F, the SOC of the battery 3 is the highest, and the upper-limit generated electric power is the lowest.

Stars shown in the characteristic coordinates in FIG. 4 and FIG. 5 represent an operating point a of the optimization revolution speed and the optimization torque at which the fuel consumption efficiency of the engine 1 is maximized. The product of the optimization revolution speed and the optimization torque serves as the optimization generated electric power.

Further, in a lower part of each of the characteristic coordinates, there is an abnormal noise generation region (a hatched region) where rattle noise or the like is generated in the engine 1, and rattle noise or the like is generated in the engine 1 when the operating point is included in this region.

A is located at a position higher than the operating point a in the target revolution speed direction and the target torque direction, and shows that the upper-limit generated electric power is higher than the optimization generated electric power. In this case, when the generated electric power control part 931 receives the electric power generation requirement signal or the catalyst warm-up requirement signal, the generated electric power control part 931 generates electric power with use of the engine 1 and the generator 2 with the operating point a (the optimization revolution speed and the optimization torque).

B to F pass positions lower than the operating point a in the target revolution speed direction and the target torque direction, and show that the upper-limit generated electric power is lower than the optimization generated electric power. In the cases of B and C, the generated electric power control part 931 controls the target revolution speed and the target torque (the operating point) so that the target generated electric power coincides with the upper-limit generated electric power determined based on the SOC, and also calculates (controls) the target revolution speed and the target torque so that the operating point is positioned in a proper region outside the abnormal noise generation region in each of the characteristic coordinates.

Although B passes a position lower than the operating point a in the target revolution speed direction and the target torque direction, B does not intersect the abnormal noise generation region. In this case, when the generated electric power control part 931 receives the electric power generation requirement signal or the catalyst warm-up requirement signal, the generated electric power control part 931 calculates the target revolution speed and the target torque so as to coincide with the operating point b. However, the target revolution speed is fixed to the optimization revolution speed, and only the target torque is reduced.

Although C passes a position in the abnormal noise generation region, revolution speed at the intersection (displacement c') with a boundary line between the abnormal noise generation region and the proper region outside the abnormal noise generation region is higher than the optimization revolution speed. In this case, when the generated electric power control part 931 receives the electric power generation requirement signal or the catalyst warm-up requirement signal, the generated electric power control part 931 calculates the target revolution speed and the target torque so that the target generated electric power coincides with the upper-limit generated electric power (an operating point c). However, the target revolution speed is fixed to the optimization revolution speed, and only the target torque is reduced. The operating point may be controlled so as to be at the displacement c'.

Although D passes the abnormal noise generation region, the target revolution speed at an intersection (an operating point d) coincides with the optimization revolution speed. In this case, when the generated electric power control part 931 receives the electric power generation requirement signal or the catalyst warm-up requirement signal, the generated electric power control part 931 calculates the target revolution speed and the target torque so that the target generated electric power coincides with the upper-limit generated electric power (the operating point d).

In A to D, the target torque is calculated so that the operating point overlaps a characteristic line L1 on which the target revolution speed is controlled so as to be the optimization revolution speed. Thus, it is possible to maintain high fuel consumption efficiency of the engine 1.

In D to F, the target revolution speed and the target torque are calculated so that the target generated electric power coincides with the upper-limit generated electric power determined based on the SOC. At the same time, the target revolution speed and the target torque are calculated so that the operating point overlaps an intersection at which the boundary line (a characteristic line L2) and the curved line representing the upper-limit generated electric power intersect in each of the characteristic coordinates.

E passes the abnormal noise generation region, and the target revolution speed at its intersection (an operating point e) is lower than the optimization revolution speed. In this case, when the generated electric power control part 931 receives the electric power generation requirement signal or the catalyst warm-up requirement signal, the generated electric power control part 931 calculates the target revolution speed and the target torque so that the target generated electric power coincides with the upper-limit generated electric power (the operating point e).

F passes the abnormal noise generation region, and the target revolution speed at its intersection (an operating point f) is even lower than that in the case of E. In this case, when the generated electric power control part 931 receives the electric power generation requirement signal, the generated electric power control part 931 calculates the target revolution speed and the target torque so that the target generated electric power coincides with the upper-limit generated electric power (the operating point f).

As shown in FIG. 4, when the generated electric power control part 931 receives the electric power generation requirement signal, the generated electric power control part 931 calculates the target revolution speed and the target torque so that the operating point is located at a position on either the characteristic line L1 or the characteristic line L2 shown in FIG. 4 based on the upper-limit generated electric power determined based on the SOC.

Similarly, in the cases of A to E, when the generated electric power control part 931 receives the catalyst warm-up requirement signal, the generated electric power control part 931 calculates the target revolution speed and the target torque as described above. Meanwhile, in the case of F, when the target revolution speed is lower than the lower-limit revolution speed (2000 rpm when the vehicle speed is equal to or higher than 18 kph, 1400 rpm when the vehicle speed is equal to or lower than 15 kph), it takes time until temperature of the catalyst increases even if the warm-up control is performed based on the target revolution speed, and the warm-up control does not end. In order to address this, it is considered to apply a catalyst containing an amount of catalytic noble metal that maintains at least a certain level of catalytic performance or higher. However, there is a problem that cost is increased.

Therefore, as shown in FIG. 5, the generated electric power control part 931 calculates the target revolution speed and the target torque by using the upper-limit generated electric power, and, when the calculated target revolution speed (the first target revolution speed) is lower than the lower-limit revolution speed, the generated electric power control part 931 moves the operating point to a position on the boundary line (the characteristic line L2) at which the target revolution speed becomes the required warm-up revolution speed (the second target revolution speed). Thus, as shown in FIG. 5, even when the operating point pertaining to the target revolution speed and the target torque is the operating point f due to the electric power generation requirement other than the catalyst warm-up requirement, the operating point immediately moves to an operating point g on the characteristic line L2 (the target revolution speed is, for example, 2000 rpm) once the catalyst warm-up requirement starts.

In addition to moving the operating point g so that the operating point g overlaps the characteristic line L2, the operating point g may be moved to a position in the proper region outside the abnormal noise generation region, at which the target revolution speed becomes the required warm-up revolution speed. As a result, even when the SOC (the state of charge) is high, it is possible to perform the warm-up control prior to control of the SOC, and avoid generation of abnormal noise such as rattle noise. Moreover, as described above, by moving the operating point g so that the operating point g overlaps the characteristic line L2, it is possible to minimize the target torque. Therefore, it is possible to minimize the target generated electric power and thus reduce a burden on the battery 3.

With consideration of the foregoing, in this embodiment, it is possible to calculate the target revolution speed and the target torque with a simpler control method. This means that the generated electric power control part 931 prepares a map (the SOC, the target revolution speed, and the target torque) in advance in which the target revolution speed and the target torque correspond to each other so that the operating point overlaps either the characteristic line L1 and the characteristic line L2 shown in FIG. 4 in accordance with a change of the SOC.

Then, when the generated electric power control part 931 receives the electric power generation requirement signal, the generated electric power control part 931 only needs to receive information regarding the SOC from the battery 3 and extract the target revolution speed and the target torque corresponding to the information from the map.

Further, when the generated electric power control part 931 receives the catalyst warm-up requirement signal, the generated electric power control part 931 receives information regarding the SOC from the battery 3, extracts the first target revolution speed corresponding to the information from the map, and transmits the information to the catalyst warm-up requirement operation part 92. Then, when the generated electric power control part 931 receives information regarding the second target revolution speed from the catalyst warm-up requirement operation part 92, the generated electric power control part 931 only needs to extract the target torque corresponding to the second target revolution speed from the map regardless of the SOC, and generate the revolution speed command value corresponding to the second target revolution speed and the torque command value pertaining to the target torque.

In FIG. 4 and FIG. 5, on the characteristic line L1, the target revolution speed is fixed to the optimization revolution speed, and the characteristic line L1 extends from the operating point a directly below. However, the target revolution speed may not be fixed, and the characteristic line L1 may be inclined so that the target revolution speed and the target torque are lowered as they are separated from the operating point a, and the target revolution speed and the target torque may be calculated (controlled) so that the operating point is positioned within the proper region outside the abnormal noise generation region in the characteristic coordinate.

When rattle noise or the like is permitted, the first target revolution speed and the target torque corresponding to the SOC may be extracted in a stage where information regarding the SOC is received from the battery 3, and the torque command value may be generated based on the information without adjusting the target torque regardless of the second target revolution speed.

[Time Chart in the Embodiment]

Figure 6:
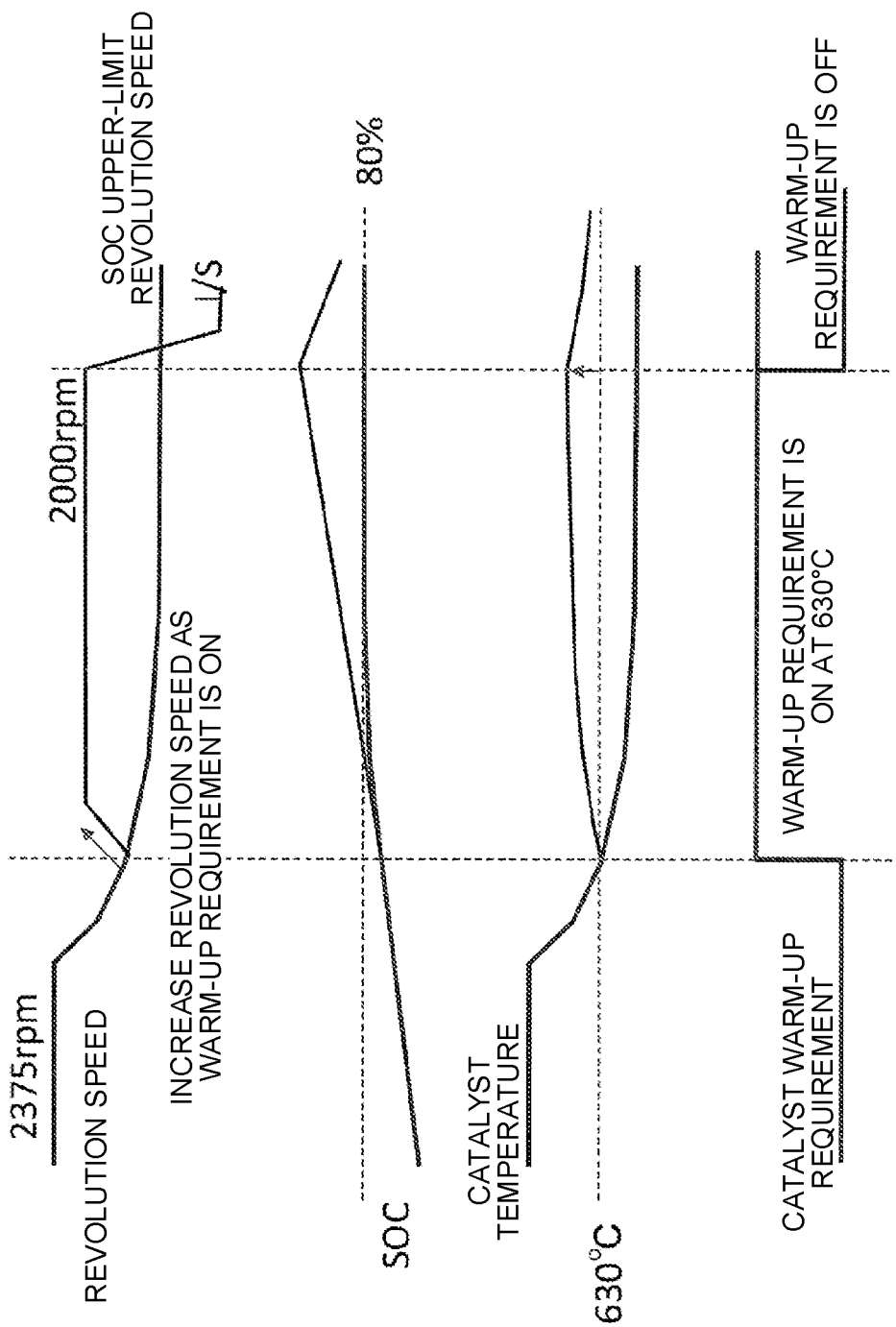
FIG. 6 is a time chart of actual revolution speed of the engine, temperature of a catalyst, and a catalyst warm-up requirement signal when the warm-up control is performed in the hybrid vehicle.

FIG. 6 is a time chart showing actual revolution speed of the engine 1, temperature of the catalyst, and the catalyst warm-up requirement signal in a case where the warm-up control is performed in the hybrid vehicle. Here, a case is assumed in which the warm-up control starts when a mode is switched to the silent mode after the battery 3 is charged with use of the engine 1 and the generator 2 in the charge mode and so on.

Assumption is made that electric power is generated with use of the engine 1 and the generator 2 based on the electric power generation requirement (the charge mode) other than the catalyst warm-up requirement. In this case, at first, the engine 1 is revolved at the optimization revolution speed (for example, 2375 rpm). However, when the SOC gets closer to the upper-limit value (for example, 80 percent), the upper-limit generated electric power is limited. Therefore, the actual revolution speed falls gradually. When the actual revolution speed falls, temperature of the catalyst falls as well. When the temperature of the catalyst is lower than the required warm-up temperature (630° C.), the warm-up control is started as the catalyst warm-up requirement operation part 92 transmits the catalyst warm-up requirement signal.

At this time, the actual revolution speed is controlled so as to be the required warm-up revolution speed (for example, 2000 rpm) regardless of the upper-limit generated electric power, and temperature of the catalyst increases. At this time, the target torque is also controlled so as to be a value with which rattle noise is not generated in the engine 1.

Then, when temperature of the catalyst is higher than the required warm-up temperature by the given temperature, or when a given period of time (for example, 15 seconds) elapses after the warm-up control starts, the warm-up control ends as transmission of the catalyst warm-up requirement signal is stopped.

At this time, the SOC temporarily increases so as to be slightly higher than the upper-limit value. However, electric power generation by the engine 1 and the generator 2 is stopped thereafter, and it is thus possible to reduce the SOC to the upper limit. As described above, as the catalyst warm-up is temporarily performed prior to the control of the SOC, exhaust gas is treated reliably, and, when temperature of the catalyst gets lower than the required warm-up temperature again, then it is possible to restart the warm-up control.

If the target revolution speed and the target torque are calculated for the catalyst warm-up requirement in accordance with FIG. 4 similarly to other electric power generation requirement, the actual revolution speed and the actual torque are limited to the upper-limit revolution speed corresponding to the upper-limit generated electric power that is determined based on the SOC even when the catalyst warm-up requirement signal is transmitted in FIG. 6, and thus do not increase to the required warm-up revolution speed. Therefore, when the control is performed so that transmission of the warm-up requirement signal is stopped when temperature of the catalyst is higher than the required warm-up temperature by the given temperature, transmission of the warm-up requirement signal does not stop. Especially, electric power generation by the engine 1 caused by the warm-up requirement is continued even though a driver selects the silent mode in which electric power generation using the engine 1 is not performed. Thus, the driver is given feeling of discomfort. Also, when the control is performed so that the warm-up control ends when the given period of time elapses after start of the warm-up control, warm-up of the catalyst is not achieved, and treatment of exhaust gas may not be completed.

However, in this embodiment, even when the SOC is positioned in the vicinity of its upper-limit value due to the charge mode and so on, the warm-up control is performed prior to the control of the SOC, and the warm-up control is thus stopped reliably after an elapse of the given period of time. Therefore, it is possible to perform the warm-up control that does not give the driver feeling of discomfort.

Further, this embodiment is applicable even when the vehicle speed is equal to or lower than 15 kph, and, in this case, since the required warm-up revolution speed is controlled so as to be 1400 rpm, it is possible to restrain an increase of the SOC more than the case where the vehicle speed is equal to or higher than 18 kph, thereby reducing a burden on the battery 3.

Effects of this Embodiment

This embodiment is the catalyst warm-up control method for the hybrid vehicle. By this method, the battery 3 supplies electric power to the electric motor 4, and, at the same time, the battery 3 is charged by the engine 1 for electric power generation. Thus, the exhaust gas discharged from the engine 1 is treated by the catalyst. By the catalyst warm-up control method, the target revolution speed and the target torque of the engine 1 are controlled based on the state of charge of the battery 3 when temperature of the catalyst is lower than the required warm-up temperature for activating the catalyst. Also, when the target revolution speed is lower than the lower-limit revolution speed at which the catalyst can be heated to the required warm-up temperature, the target revolution speed is controlled so as to be the required warm-up revolution speed that is equal to or higher than the lower-limit revolution speed.

The catalyst control device for the hybrid vehicle by which the above control method is realized is the catalyst warm-up control device for the hybrid vehicle, the catalyst warm-up control device including the battery 3 that supplies electric power to the electric motor 4, the engine 1 for electric power generation in order to charge the battery 3, and the catalyst that treats exhaust gas discharged from the engine 1. The catalyst warm-up control device includes the catalyst warm-up requirement operation part 92, and the generated electric power control part 931. The catalyst warm-up requirement operation part 92 transmits the catalyst warm-up requirement signal for requiring catalyst warm-up when temperature of the catalyst is lower than the required warm-up temperature for activating the catalyst. The generated electric power control part 931 receives the catalyst warm-up requirement signal, and controls the target revolution speed and the target torque of the engine 1. The catalyst warm-up requirement operation part 92 transmits information regarding the required warm-up revolution speed (the second target revolution speed) that is equal to or higher than the lower-limit revolution speed to the generated electric power control part 931 when the target revolution speed (the first target revolution speed) is lower than the lower-limit revolution speed at which the catalyst can be heated to temperature higher than the required warm-up temperature. When the generated electric power control part 931 receives the information regarding the required warm-up revolution speed, the generated electric power control part 931 controls the target revolution speed (the first target revolution speed) to the required warm-up revolution speed (the second target revolution speed).

Thus, even if the SOC (the state of charge) of the battery 3 is positioned in the vicinity of its upper limit, the warm-up control is performed prior to the control of the SOC, and the warm-up control is stopped reliably after the given period of time. Therefore, it is possible to perform the warm-up control that does not give the driver feeling of discomfort.

In this embodiment, when the optimization generated electric power determined based on the optimization revolution speed and the optimization torque at which the fuel consumption efficiency of the engine 1 is maximized is lower than the upper-limit generated electric power determined based on the state of charge of the battery 3, the target revolution speed is controlled so as to be the optimization revolution speed, and the target torque is controlled so as to be the optimization torque.

Similarly, when the optimization generated electric power determined based on the optimization revolution speed and the optimization torque at which the fuel consumption efficiency of the engine 1 is maximized is lower than the upper-limit generated electric power determined based on the state of charge of the battery 3, the generated electric power control part 931 controls the target revolution speed so as to be the optimization revolution speed, and controls the target torque so as to be the optimization torque. Thus, it is possible to perform the warm-up control with minimum fuel consumption.

In this embodiment, when the upper-limit generated electric power is lower than the optimization generated electric power, the target torque is reduced from the optimization torque so that the target generated electric power determined based on the target revolution speed and the target torque coincides with the upper-limit generated electric power.

Similarly, when the upper-limit generated electric power is lower than the optimization generated electric power, the generated electric power control part 931 reduces the target torque from the optimization torque so that the target generated electric power determined based on the target revolution speed and the target torque coincides with the upper-limit generated electric power. Thus, it is possible to maintain the target revolution speed at the optimization revolution speed. Therefore, it is possible to maintain high fuel consumption efficiency, and it is also possible to restrain a fall of temperature of the catalyst.

In this embodiment, in the characteristic coordinate, the axes of which represent the target revolution speed and the target torque, respectively, the target revolution speed and the target torque are controlled so that the operating point of the engine 1 is included in the proper region outside the abnormal noise generation region in which abnormal noise is generated in the engine 1. When the target revolution speed is lower than the lower-limit revolution speed, the operating point is moved to a position in the proper region, at which the target revolution speed is the required warm-up revolution speed.

Similarly, in the characteristic coordinate, the axes of which represent the target revolution speed and the target torque, respectively, the generated electric power control part 931 controls the target revolution speed and the target torque so that the operating point of the engine 1 is included in the proper region outside the abnormal noise generation region in which abnormal noise is generated in the engine 1. When the target revolution speed is lower than the lower-limit revolution speed, the generated electric power control part 931 moves the operating point to a position in the proper region, at which the target revolution speed is the required warm-up revolution speed. Thus, even when the SOC (the state of charge) is high, it is possible to perform the warm-up control prior to the control of the SOC and also avoid generation of abnormal noise such as rattle noise.

In this embodiment, in the characteristic coordinate, the axes of which represent the target revolution speed and the target torque, respectively, there is the case where the boundary line between the abnormal noise generation region in which abnormal noise is generated in the engine 1 and the proper region outside the abnormal noise generation region intersects the curved line that represents the upper-limit generated electric power determined based on the state of charge of the battery 3. In this case, the target revolution speed and the target torque are controlled so that the operating point of the engine 1 overlaps the intersection between the boundary line and the curved line. When the revolution speed is lower than the lower-limit revolution speed, the operating point is moved to a position on the boundary line, at which the revolution speed is the required warm-up revolution speed.

Similarly, in the characteristic coordinate, the axes of which represent the target revolution speed and the target torque, respectively, there is the case where the boundary line between the abnormal noise generation region in which abnormal noise is generated in the engine 1 and the proper region outside the abnormal noise generation region intersects the curved line that represents the upper-limit generated electric power determined based on the state of charge of the battery 3. In this case, the generated electric power control part 931 controls the target revolution speed and the target torque so that the operating point of the engine 1 overlaps the intersection between the boundary line and the curved line. When the target revolution speed is lower than the lower-limit revolution speed, the generated electric power control part 931 moves the operating point to a position on the boundary line, at which the target revolution speed is the required warm-up revolution speed.

Because of this, even when the SOC (the state of charge) is high, it is possible to perform the warm-up control prior to the control of the SOC and to avoid generation of abnormal noise such as rattle noise, and it is also possible to minimize the target torque in this state. Therefore, it is possible to minimize the target generated electric power and thus reduce the burden on the battery 3.

In this embodiment, the required warm-up temperature and the required warm-up revolution speed are determined based on the vehicle speed. Similarly, the catalyst warm-up requirement operation part 92 determines the required warm-up temperature and the required warm-up revolution speed based on the vehicle speed. Thus, it is possible to perform the catalyst warm-up corresponding to the vehicle speed without the burden on the hybrid vehicle (the battery 3).

The embodiment of the invention has been described so far. However, the embodiment only shows an example of application of the invention, and is not intended to limit the technical range of the invention to the specific configuration of the embodiment described above.

The invention claimed is:

1. A catalyst warm-up control method for a hybrid vehicle in which a battery supplies electric power to an electric motor, the battery charged by an engine for electric power generation, the method comprising:
   treating exhaust gas discharged from the engine by a catalyst;
   when a temperature of the catalyst is lower than a required warm-up temperature for activating the catalyst, controlling a target revolution speed and a target torque of the engine based on a state of charge of the battery;
   controlling the target revolution speed to be a required warm-up revolution speed that is equal to or higher than a lower-limit revolution speed at which the catalyst can be heated to the required warm-up temperature when the target revolution speed is lower than the lower-limit revolution speed;

determining an upper-limit generated electric power of the engine for limiting a generated electric power of the engine based on the state of charge of the battery when the state of charge of the battery nears a predetermined upper limit value; and controlling the target revolution speed so as to be the required warm-up revolution speed when the temperature of the catalyst is lower than the required warm-up temperature even if the generated electric power exceeds the upper-limit generated electric power.

2. The catalyst warm-up control method for the hybrid vehicle according to claim 1, further comprising:

determining an optimization generated electric power based on an optimization revolution speed and an optimization torque at which fuel consumption efficiency of the engine is maximized; and when the optimization generated electric power is lower than the upper-limit generated electric power, controlling the target revolution speed to be the optimization revolution speed and the target torque to be the optimization torque.

3. The catalyst warm-up control method for the hybrid vehicle according to claim 1, further comprising:

in a characteristic coordinate, axes of which represent the target revolution speed and the target torque, respectively, controlling the target revolution speed and the target torque so that an operating point of the engine is included in a proper region outside an abnormal noise generation region in which abnormal noise is generated in the engine; and when the target revolution speed is lower than the lower-limit revolution speed, moving the operating point to a position in the proper region, at which the target revolution speed is the required warm-up revolution speed.

4. The catalyst warm-up control method for the hybrid vehicle according to claim 1, further comprising:

in a characteristic coordinate, axes of which represent the target revolution speed and the target torque, respectively, when a boundary line between an abnormal noise generation region in which abnormal noise is generated in the engine and a proper region outside the abnormal noise generation region intersects a curved line that represents the upper-limit generated electric power, controlling the target revolution speed and the target torque so that an operating point of the engine overlaps the intersection between the boundary line and the curved line; and when the target revolution speed is lower than the lower-limit revolution speed, moving the operating point to a position on the boundary line, at which the target revolution speed is the required warm-up revolution speed.

5. The catalyst warm-up control method for the hybrid vehicle according to claim 1, wherein the required warm-up temperature and the required warm-up revolution speed are determined based on vehicle speed.

6. A catalyst warm-up control device for a hybrid vehicle including:

a battery configured to supply electric power to an electric motor;

an engine configured to generate electric power to charge the battery; and a catalyst configured to treat exhaust gas discharged from the engine; and a controller configured to:

transmit a catalyst warm-up requirement signal that requires catalyst warm-up when a temperature of the catalyst is lower than a required warm-up temperature for activating the catalyst;

receive the catalyst warm-up requirement signal and control a target revolution speed and a target torque of the engine;

transmit information regarding a required warm-up revolution speed that is equal to or higher than a lower-limit revolution speed to control the engine when the target revolution speed is lower than the lower-limit revolution speed at which the catalyst can be heated to a temperature higher than the required warm-up temperature;

determine an upper-limit generated electric power of the engine for limiting generated electric power based on a state of charge of the battery when the state of charge of the battery nears a predetermined upper limit value; and control the target revolution speed to be the required warm-up revolution speed upon receipt of the information regarding the required warm-up revolution speed even if the electric power generated by the engine exceeds the upper-limit generated electric power.

7. The catalyst warm-up control device for the hybrid vehicle according to claim 6, wherein the controller is further configured to:

determine an optimization generated electric power based on an optimization revolution speed and an optimization torque at which fuel consumption efficiency of the engine is maximized; and when the optimization generated electric power is lower than the upper-limit generated electric power, control the target revolution speed to be the optimization revolution speed, and control the target torque to be the optimization torque.

8. The catalyst warm-up control device for the hybrid vehicle according to claim 6, wherein the controller is further configured to:

in a characteristic coordinate, axes of which represent the target revolution speed and the target torque, respectively, control the target revolution speed and the target torque so that an operating point of the engine is included in a proper region outside an abnormal noise generation region in which abnormal noise is generated in the engine; and when the target revolution speed is lower than the lower-limit revolution speed, move the operating point to a position in the proper region at which the target revolution speed is the required warm-up revolution speed.

9. The catalyst warm-up control device for the hybrid vehicle according to claim 6, wherein the controller is further configured to:

in a characteristic coordinate, axes of which represent the target revolution speed and the target torque, respectively, when a boundary line between an abnormal noise generation region in which abnormal noise is generated in the engine, and a proper region outside the abnormal noise generation region intersects a curved line that represents the upper-limit generated electric power, control the target revolution speed and the target torque so that an operating point pertaining to the target revolution speed and the target torque overlaps the intersection between the boundary line and the curved line; and when the target revolution speed is lower than the lower-limit revolution speed, move the operating point to a position on the boundary line at which the target revolution speed is the required warm-up revolution speed.

10. The catalyst warm-up control device for the hybrid vehicle according to claim 6, wherein the controller is further configured to determine the required warm-up temperature and the required warm-up revolution speed based on vehicle speed.

* * * * *